(12) United States Patent
Defoort

(10) Patent No.: US 7,983,331 B2
(45) Date of Patent: Jul. 19, 2011

(54) METHOD TO DETECT MISSING FILTER/SPLITTER AND APPARATUS FOR PERFORMING SUCH A METHOD

(75) Inventor: Frank Cyriel Michel Defoort, Kruibeke-Bazel (BE)

(73) Assignee: Alcatel Lucent, Paris (FR)

( * ) Notice: Subject to any disclaimer, the term of this patent is extended or adjusted under 35 U.S.C. 154(b) by 1261 days.

(21) Appl. No.: 11/514,884

(22) Filed: Sep. 5, 2006

(65) Prior Publication Data

US 2007/0053304 A1    Mar. 8, 2007

(30) Foreign Application Priority Data

Sep. 6, 2005  (EP) .................................. 05291838

(51) Int. Cl.
    *H04B 17/00*  (2006.01)
(52) U.S. Cl. ........ 375/224; 375/219; 375/220; 375/222; 370/250; 370/493; 379/1.01; 379/1.03; 379/1.04; 379/9.06; 379/10.01
(58) Field of Classification Search .................. 375/219, 375/220, 222, 224; 370/250, 493; 379/1.01, 379/1.03, 1.04, 9.06, 10.01
    See application file for complete search history.

(56) References Cited

U.S. PATENT DOCUMENTS 6,819,745 B2 * 11/2004 Hollenbeck et al. ......... 379/1.03
2002/0196908 A1    12/2002 Hollenbeck et al.

OTHER PUBLICATIONS

U.S. Appl. No. 11/313,922, filed Dec. 22, 2005, entitled Test Method and Apparatus for In-House Wiring Problems.

* cited by examiner

*Primary Examiner* — Leon Flores
(74) *Attorney, Agent, or Firm* — Harness, Dickey & Pierce, PLC

(57) ABSTRACT

A method to detect a defective or missing filter at a customer's side between a first connection having a first frequency spectrum and a second connection having a second frequency spectrum and using the same physical transmission medium as the first connection between said customer and a central office equipment (DSLAM), comprises the steps of
  generating and transmitting at least one first type signal within said first frequency spectrum
  simultaneously performing quality measurements on said second connection in said second frequency spectrum,
  analyzing said quality measurements for thereby concluding the presence or not of the correct functionality and presence of said filter.
An apparatus for performing the method is as well disclosed.

7 Claims, 4 Drawing Sheets

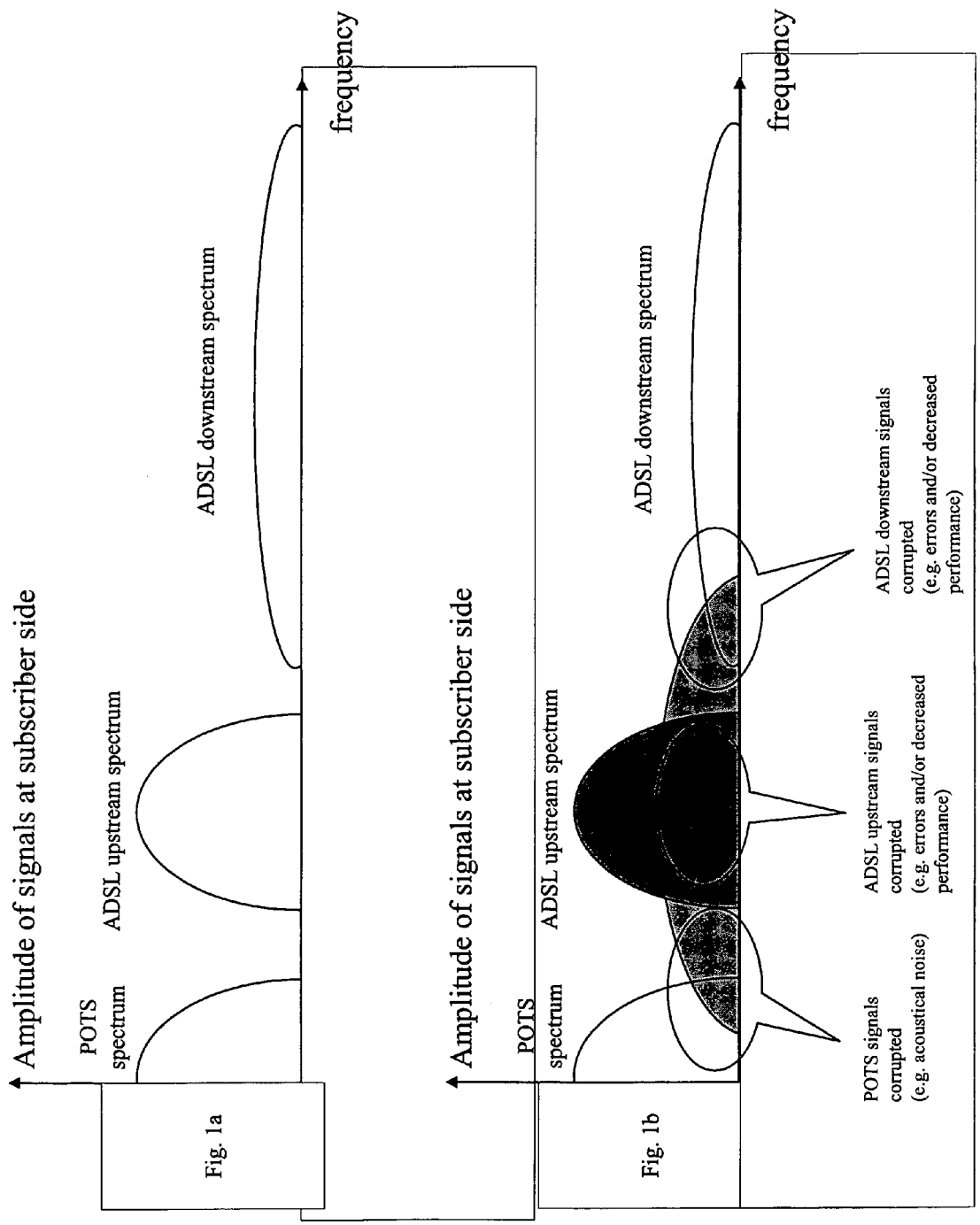

METHOD TO DETECT MISSING FILTER/SPLITTER AND APPARATUS FOR PERFORMING SUCH A METHOD

The present invention relates to method to detect a missing filter/splitter, as is described in the non-characterizing portion of the first claim.

Such a method is already known in the art, e.g. from the not yet published European Patent Application No 04293136.0, filed on Dec. 24, 2004 by the same applicant. Therein a remote and automated test method to detect in-house cabling problems such as missing splitters/filters or bad quality in-house cabling, by means of tuning upstream broadband transmission profiles, and by observing reactive downstream broadband parameter modifications.

In this patent application reference is made to xDSL, which implies the simultaneous provision of two services: a first narrowband-Plane Old Telephone service (POTS), and a second, broadband service. Both services each occupy a different frequency spectrum. The prior art method uses a specific portion of the broadband spectrum, namely the upstream part therein, for generating therein at least two upstream profiles applied by the CPE modem. These are applied upon receiving instructions from a central device within the network such as a network analyser. Next parameter changes in the downstream part of this broadband service are monitored at the customer's side, and these measurements are further provided back to a network analyser centrally in the network.

A drawback of this prior art method is that it requires at least two upstream profiles to be subsequently applied by the CPE modem. Such changing profiles require service interruption, line re-configuration and restarting the DSL connection with the new profile.

An object of the invention is therefore to provide a method to detect a missing or defective filter/splitter, and which can be applied when the broadband connection is in service.

According to the invention this object is achieved by the features as claimed in the characterizing portion of the first claim.

Figure 1C:
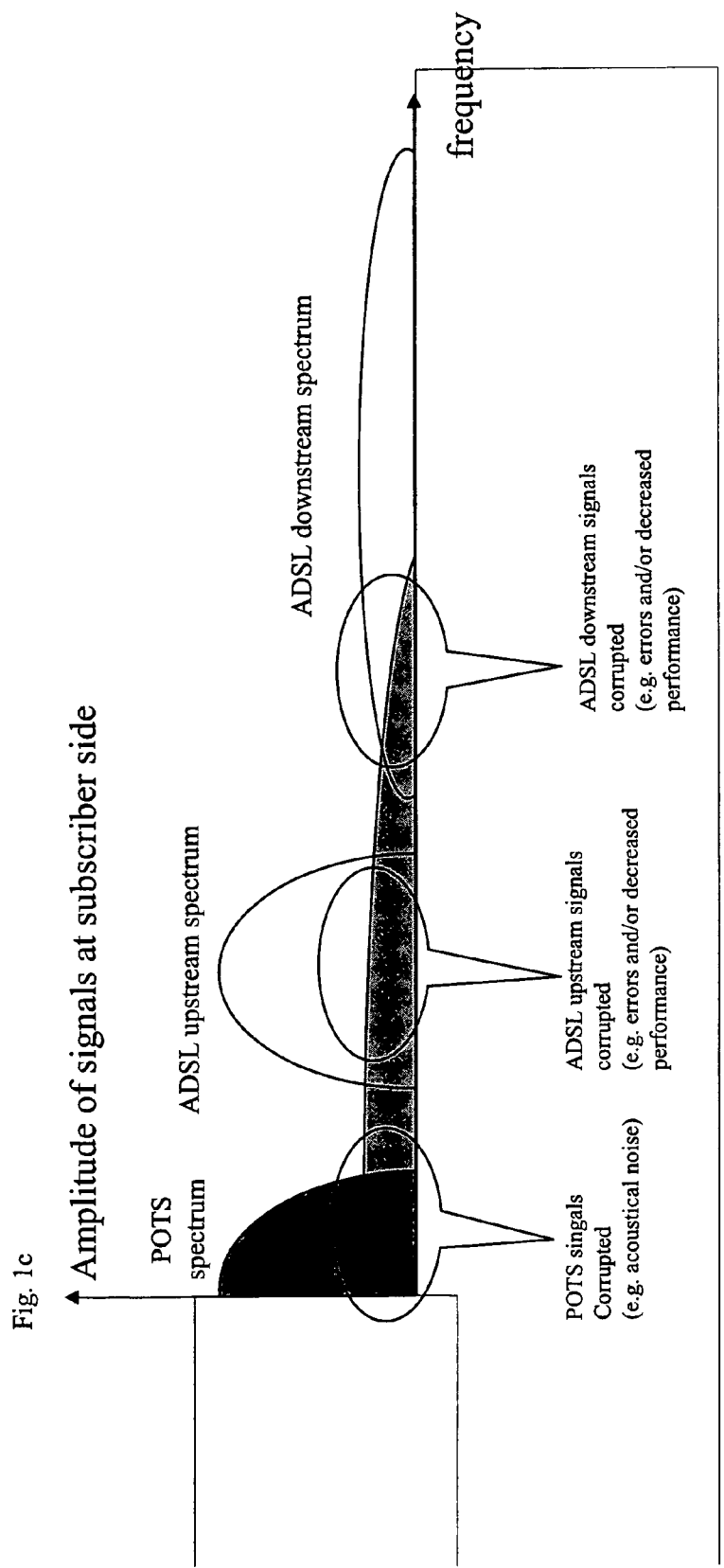

By means of generating specific signals of one service, such as for instance the narrowband POTS service, and by measuring their impact in the other service, such as the broadband service, no specific interruption of the broadband service is required, since this measurement can be performed simultaneous with the broadband service such as during transfer of data. Even when the broadband connection is not active, still measurements can be performed at the broadband receivers on either end to measure the energy from the disturbant signal which, in the case of a missing or malfunctioning splitter at one side, has been demodulated into specific spectra. Indeed, in case of a missing or wrong filter, demodulation products in the normal xDSL spectra can be observed; as schematically shown on FIGS. 1b and c. FIG. 1a shows the normal ideal delimited and split frequency bands available in xDSL services at the customer's side of the link, comprising the low frequency POTS spectrum, a high frequency ADSL downstream spectrum, and in between the xDSL upstream spectrum. Both the upstream and downstream spectrum belong to the broadband connection, whereas the baseband POTS spectrum belongs to the POTS connection. The presence of splitters in both the CPE and the CO guarantees the different spectra to be separated. At CO side splitters are normally present and operating well, but at the CPE side splitters are not always installed, or may be malfunctioning. POTS equipment at the CPE side however contains components which behave non-linear. This means that signals arriving at such non-linearity are demodulated, and their energy is spread over a wider spectrum if no splitter is available. As such, these non-linearities cause inter-mixing of POTS and broadband signals. For instance, a non-linearity of a phone equipment connected to the ADSL wiring will cause the energy of the strong in-house ADSL upstream signal to be spread over the POTS spectrum, the ADSL upstream spectrum, and the ADSL downstream spectrum, corrupting all of them, as is shown in FIG. 1b. Similarly, in case of a strong POTS ringing signal available in house, this signal will also be partially demodulated into the ADSL upstream and even downstream spectrum after hitting a non-linearity, as is shown in FIG. 1c. Only when all connected equipment (with eventual non-linearities) is adequately filtered, hiding any non-linearity, the narrowband and broadband service will not disturb each other. But if these filters are not available or are malfunctioning, these intermodulation products will appear.

Instead of deliberately transmitting a low frequency test signal, also specific broadband signals can be applied, whereas the influence on the narrowband POTS may be measured during POTS service. Thus a very versatile method is provided.

An additional characteristic feature of the present invention is set out in claim 2.

This guarantees that the execution of the quality measurements can occur simultaneously with the transmission of the signals.

As set out in claim 3, a preferred embodiment of the method uses the narrowband POTS spectrum for transmitting therein narrowband POTS signals, which are strong enough to generate disturbance within the broadband spectrum when a non-linearity would be present on the cable. As described in claim 4, the narrowband POTS signals are transmitted in the preferred embodiment from a central narrowband switch, whereas the measurements in the broadband spectrum are performed at the customer's side. Similarly, as set out in claim 5, while the narrowband POTS signals are transmitted again from a central narrowband switch, its effect on the upstream broadband spectrum will be measured on the central office.

The present invention also relates to an apparatus for performing the subject method, and to a central office and subscriber modem including means for performing the subject method.

Figure 2:
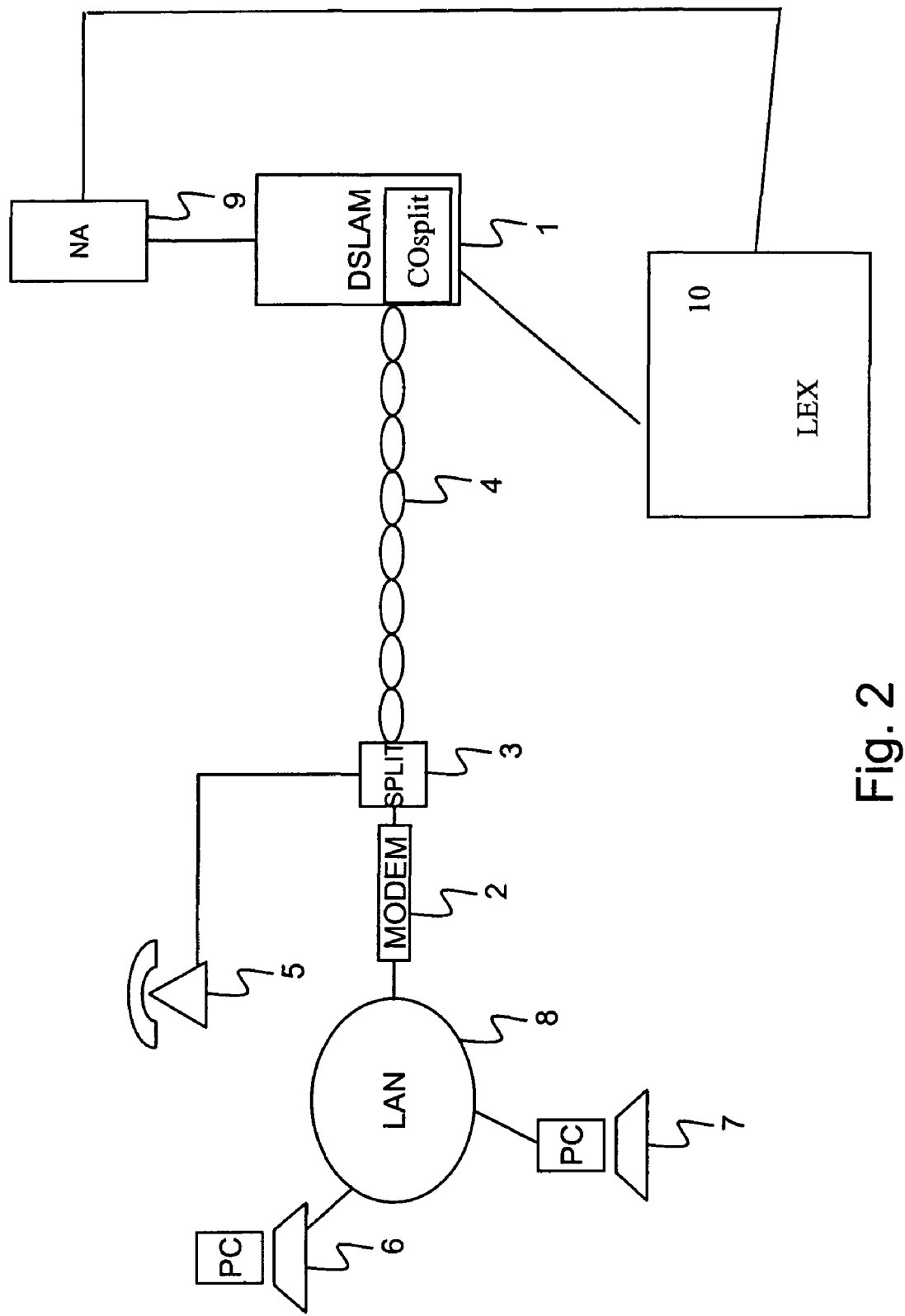
Figure 3:
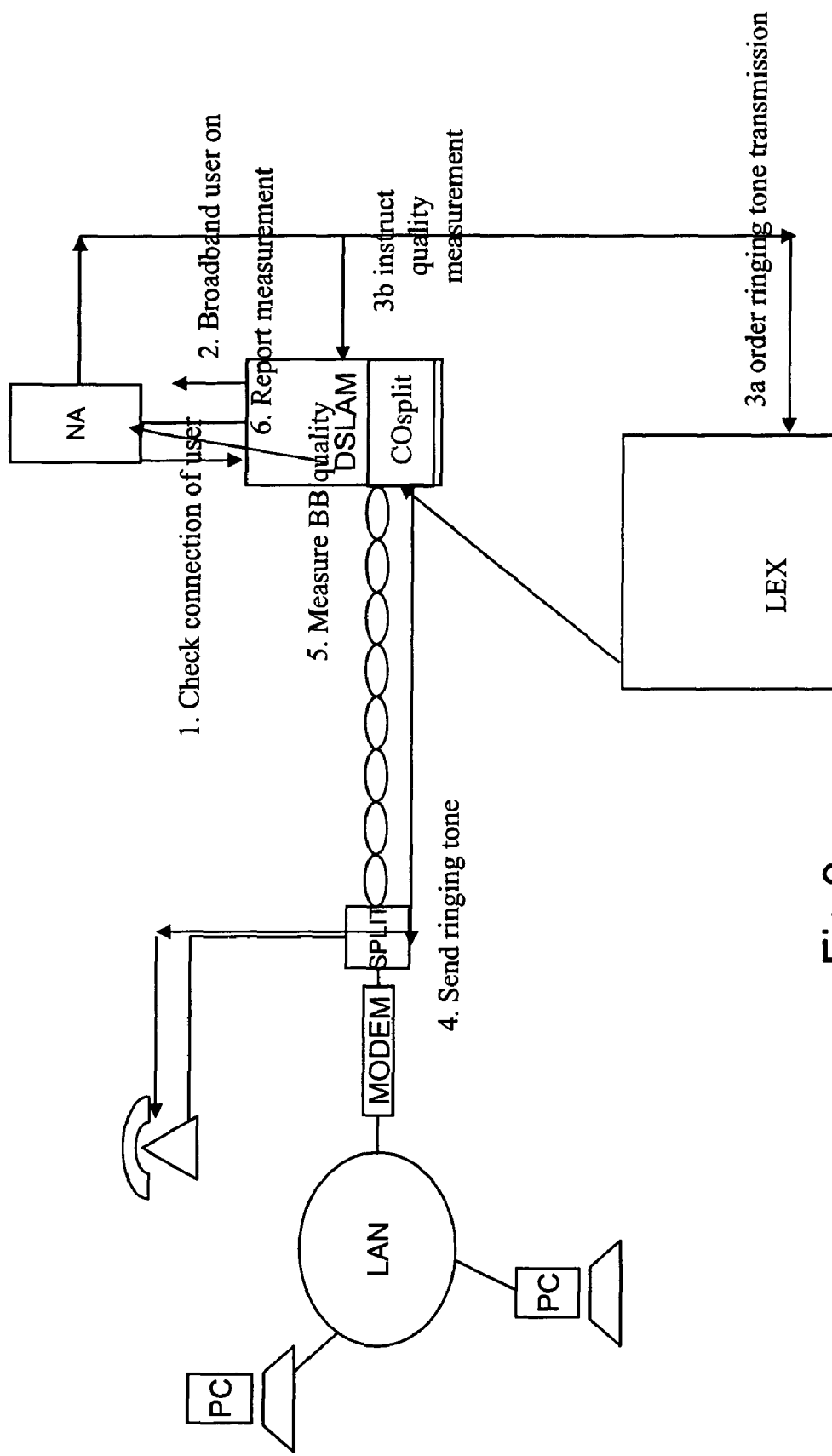

The above and other objects and features of the invention will become more apparent and the invention itself will be best understood by referring to the following description of an embodiment taken in conjunction with the accompanying drawings wherein:

FIG. 1a schematically represents the different frequency spectra present in xDSL services as observed on the subscriber side in the presence of good functioning subscriber splitter, FIG. 1b shows the effect of missing or malfunctioning splitter on the subscriber side in case of strong ADSL upstream signals, FIG. 1c shows the effect of missing or malfunctioning splitter on the subscriber side in case of strong POTS signals, FIG. 2 represents a schematic of a DSL network wherein the invention can be used, FIG. 3 gives a schematic of the different communication messages used for applying this method.

FIG. 2 depicts an Asymmetric Digital Subscriber Line (ADSL) network wherein a central office ADSL modem in the central office 1 (DSLAM) connects to a customer premises ADSL modem 2 (MODEM) via a twisted pair copper subscriber line 4. At the customer premises, a splitter 3 (SPLIT) is placed at the subscriber line termination, the splitter 3 having input/output ports connected respectively to the modem 2 and a telephone set 5 (POTS phone). In the subscriber's home, different PCs, 6 and 7, are connected to the modem 2 via a local area network 8 (LAN) such that the PCs can share the ADSL connection towards the central office. At the operator's side, a network analyzer 9 (NA), for instance a network diagnostic and analytic software tool running on a computer, is coupled to the central office 1. In addition a narrowband switch 10 (LEX) is also coupled to both the network analyser 9 and the central office 1, this last connection through a splitter (COSPLIT) incorporated in the central office. Throughout the whole text of this document it is implicitly understood that the central office splitter is present and functioning well.

To facilitate the work of technical staff of customer care services of the telecom operator that operates the ADSL network, a test tool for detecting in-house wiring problems such as a missing or malfunctioning customer splitter 3, is implemented in the network analyzer 9. This test tool is a software module that has access to the modem parameters of the central office modem, and via physical layer protocols also to the parameters received from the CPE modem, and is able to instruct the narrowband switch to transmit at least one narrowband signal to the customer. This particular narrowband signal has to have an amplitude which is large enough to possibly cause some disturbance on the broadband connection, in case of a missing or bad CPE splitter which does not sufficiently shield the non-linearity of a phone equipment as explained in a previous paragraph of this document. This means that signals arriving at such non-linearity are demodulated, and their energy is spread over a wider spectrum. As such, those non-linearities cause inter-mixing of POTS and broadband signals as was shown in FIGS. 1b and 1c. For instance, a non-linearity of a phone equipment connected to the ADSL wiring will cause the energy of the strong in-house ADSL upstream signal to be spread over the POTS spectrum, the ADSL upstream spectrum, and the ADSL downstream spectrum, corrupting all of them (FIG. 1b). Similarly, a strong POTS ringing signal will be partially demodulated into the ADSL upstream and even downstream spectrum after hitting a non-linearity (FIG. 1c). Only when all connected equipment (with eventual non-linearities) is adequately filtered by a good functioning CPE splitter, hiding any non-linearity, the narrowband and broadband service will not disturb each other.

The disturbance caused by the narrowband signal transmitted on request of the test tool, can, in case of a bad splitter, be measured at the broadband transceiver at CPE or CO side. In case of ADSL broadband signals, the disturbing narrowband signal transmitted by the narrowband switch on command of the test tool in the network analyser, will affect mainly the broadband upstream frequency band closest to the POTS frequency band, as depicted in FIGS. 1b and 1c. The broadband transceiver at CO side will in this case be most suited to measure the impact of the disturbance. Typical examples of such narrowband disturbance signals used for this purpose are the metering signals, and ringing signals. It is to be remarked that the narrowband signals can be POTS signals, but can also be ISDN signals. In another embodiment (not shown on the figures), the network analyser, after detecting that a broadband connection is established between the user CPE and the central office, can as well instruct the user at the CPE premises to generate such narrowband signals, for instance on/off hook, whereupon also the broadband modem in the central office has to detect whether this influences the quality of the broadband upstream signal. In yet other embodiments the quality measurements are performed by the CPE modem, and transmitted to the DSLAM modem, from where they are gathered by the network analyzer. The test tool software module in either embodiment thus always aims at detection of a missing or malfunctioning splitter at the CPE side.

In a preferred embodiment to detect missing splitters or inline filters, the diagnostic software module at the Network Analyser first transmits an inquiry message to the DSLAM for detecting whether a broadband connection is currently set up between the user to be diagnosed and the DSLAM itself. This is schematically indicated in FIG. 3 by the signal 1 "check connection of user". The DSLAM accordingly responds with either a confirmation message (signal 2 "broadband user on") indicative of an active connection or not. In a variant embodiment a signal "broadband user off" may as well be used, undoubtedly indicating whether the broadband user is on-line or not. Next, the diagnostic tool will accordingly send two messages: a first one (3b "instruct quality measurement") to order the DSLAM to perform quality measurements at its modem, and a second one to the local switch, ordering the latter to generate a narrowband signal (3a "order ringing tone transmission"), such as for instance a ringing tone, for being transmitted via the COsplitter at the DSLAM over the ADSL connection to the user's telephone The local exchange will respond by transmitting such a ringing tone. (signal 4 "send ringing tone").

In case the broadband connection is active, and assuming the user does not possess a good functional in-house splitter, the transmission of this ringing tone will have as a result that this ringing narrowband signal disturbs the broadband connection, both in upstream as in downstream. This results in a degradation of the quality of the broadband connection, which is measured in the DSLAM modem (step 5 "measure BB quality") and/or optionally at the CPE modem. These measurements consist for instance on Forward Error correction actions, noticed uncorrectable frames (e.g. CRC error over superframe), errored ATM headers, signal or frame loss during short time, bitswap actions to reshape used spectrum, etc. The CPE measurements are regularly forwarded to the DSALM modem through the ADSL physical layer channels.

In case the broadband connection is not active, and assuming the user does not possess a good functional in-house splitter, the transmission of this ringing tone will have as a result that this narrowband signal demodulates and brings energy in the upstream and downstream broadband spectra. This is possible due to the fact that, even if no active connection is available, there are ways to activate the receiver to measure the energy on the line. This is for instance used in ADSL1 to measure QLN, which is the abbreviation of Quiet Line Noise. The receiver in the DSLAM modem will be able to measure the energy change in the upstream ADSL spectrum during the application of the narrowband signal.

In either case, the DSLAM modem shares the measurement results and timing info of those with the test software of the diagnostic tool. (step 6 "report measurement") The test software analyzes these measurements, correlates the timing info with the timing of the generation of the disturbing narrowband signal, and will conclude that the central splitter 3 or an inline filter is missing when a clear correlation can be found between the narrowband disturbing signal and the consequences on the broadband signals, such as errors, changed bitloading, or temporarily energy increase in case of a non-active broadband connection. In an other embodiment (not shown in the figures) the network analyser, after determining an active or inactive broadband connection between the user and the DSLAM, will not order a local switch for generating and transmitting the narrowband signal, but will order the customer to do so. To this purpose the network analyser can instruct the user to e.g. perform an on/hook-off/hook measurement. This instruction can be given via a pop-up message, or an email to the user, or via a special phone call. At the same time, the diagnostic software again informs the DSLAM for performing the quality measurements.

In yet another embodiment (not shown in the figures), the quality measurements are performed in the CPE modem, and are further transmitted to the CO modem, which further transmits them to the network analyser.

In still other embodiments the reverse impact can be analysed as well, for instance by measuring the different impact on the POTS or ISDN signal when the ADSL upstream signals are respectively active or inactive. Impact on the POTS can be detected by performing signal quality measurements in the POTS service, or by energy measurements in the POTS band.

As an alternative to residing in the network analyzer 9, the test software according to the present invention may be part of the CO modem or DSLAM software. It can be part of the firmware associated with ASICs wherein the CO modem is integrated. Alternatively, its function may be implemented partially or integrally in hardware residing on the linecards in the central office 1, or on a separate test card in the central office 1, or even in a separate test hardware to be connected to the central office 1.

Although reference was made above to xDSL (Asymmetric Digital Subscriber Line technology used for transmission over twisted pair telephone lines), any skilled person will appreciate that the present invention can be applied with same advantages in a cable based, a fiber based or a radio based access system, where variant access multiplexers aggregate the traffic from and to a substantial amount of access subscribers via optical cable or wireless links that may be affected by connected non-linearities causing signal intermodulations. Thus the access multiplexer could alternatively be a PON OLT (Passive Optical Network Line Termination), a mini-DSLAM or fiber-fed remote cabinet serving a smaller amount of ADSL or VDSL subscribers, a DLC (Digital Loop Carrier), etc.

Furthermore, it is remarked that an embodiment of the present invention is described above rather in functional terms. From the functional description, it will be obvious for a person skilled in the art of telecom hardware and/or software design, how to develop embodiments of the invention.

While the principles of the invention have been described above in connection with specific apparatus, it is to be clearly understood that this description is made only by way of example and not as a limitation on the scope of the claims.

The invention claimed is:

1. A method to detect a defective or missing filter at a customer's side between a first connection having a first frequency spectrum and a second connection having a second frequency spectrum and using the same physical transmission medium as the first connection between said customer and a central office equipment, the method comprising:
    generating and transmitting at least one first type signal within said first frequency spectrum;
    simultaneously performing quality measurements on said second connection in said second frequency spectrum; and
    analyzing said quality measurements to determine the presence or not of correct functionality and presence of said filter, wherein said first connection is a narrowband connection and wherein said second connection is a broadband connection, and the simultaneously performing quality measurements step includes measuring a signal quality of the second connection and determining whether the first type signal caused a disturbance in the signal quality of the second connection based on the signal quality measurements.

2. The method of claim 1, wherein the generation of said at least one first type signal and the simultaneous quality measurements are performed upon triggering by a diagnostic tool, and whereby the analysis of the quality measurements is performed by said diagnostic tool.

3. The method of claim 1, wherein the at least one first type signal is a narrowband signal generated by a central narrowband switch (LEX) or by a customer, whereas the measurements are performed on a broadband spectrum at the customer's side or at said central office equipment (DSLAM).

4. The method of claim 1, wherein the at least one first type signal is a broadband signal generated at the central office equipment (DSLAM) or at the customer's side, whereas the measurements are performed on a narrowband spectrum at the central office equipment (DSLAM) or at the customer's side.

5. Apparatus for detecting a defective or missing filter between a first connection having a first frequency spectrum and a second connection having a second frequency spectrum and using the same physical transmission medium as the first connection between a customer and a central office equipment, the apparatus comprising:
    a first instructing component configured to instruct a first device coupled to said apparatus to generate and to transmit at least one first type signal within said first frequency spectrum;
    a second instructing component configured to simultaneously instruct said central office equipment (DSLAM) coupled to said apparatus to perform quality measurements on said second connection;
    a receiving component configured to receive from said central office equipment said quality measurements and to analyze said quality measurements to determine the correct functionality and presence of said filter, wherein said first connection is a narrowband connection and wherein said second connection is a broadband connection, and the receiving equipment is configured to measure a signal quality of the second connection and determine whether the first type signal caused a disturbance in the signal quality of the second connection based on the quality measurements.

6. A network analyzer, the network analyzer comprising: the apparatus of claim 5.

7. A system, the system comprising:
    an apparatus configured to a defective or missing splitter; and
    a narrowband switch coupled to a central office equipment for generating narrowband signals for transmission to a customer, wherein said narrowband switch is further coupled to said apparatus and configured to receive from said apparatus instructions to generate and to transmit at least one first type narrowband signal to said customer; wherein the apparatus is configured to simultaneously perform quality measurements on a broadband connection, and to measure a signal quality of the broadband connection, and to determine whether the at least one first type narrowband signal caused a disturbance in the signal quality of the broadband connection based on the quality measurements.

* * * * *